United States Patent
Chu et al.

(10) Patent No.: US 10,298,287 B2
(45) Date of Patent: May 21, 2019

(54) MOBILE TERMINAL AND WIRELESS COMMUNICATION METHOD

(71) Applicant: NUBIA TECHNOLOGY CO., LTD, Shenzhen (CN)

(72) Inventors: Tongsong Chu, Shenzhen (CN); Chunlin Li, Shenzhen (CN)

(73) Assignee: NUBIA TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/765,053

(22) PCT Filed: Sep. 19, 2016

(86) PCT No.: PCT/CN2016/099305
§ 371 (c)(1),
(2) Date: Mar. 30, 2018

(87) PCT Pub. No.: WO2017/054657
PCT Pub. Date: Apr. 6, 2017

(65) Prior Publication Data
US 2018/0278289 A1    Sep. 27, 2018

(30) Foreign Application Priority Data

Sep. 30, 2015  (CN) .......................... 2015 1 0641418
Oct. 30, 2015  (CN) .......................... 2015 1 0719487

(51) Int. Cl.
*H04B 1/401*   (2015.01)
*H04W 76/15*   (2018.01)
(Continued)

(52) U.S. Cl.
CPC ............ *H04B 1/401* (2013.01); *H04W 76/15* (2018.02); *H04W 88/06* (2013.01); *H04W 84/042* (2013.01); *H04W 88/02* (2013.01)

(58) Field of Classification Search
CPC ..... H04W 88/02; H04W 88/06; H04W 76/15; H04W 84/04; H04W 84/082; H04B 1/401–408; H04B 1/44
See application file for complete search history.

(56) References Cited

U.S. PATENT DOCUMENTS 9,414,308 B2 *   8/2016   Chen ................... H04W 48/20
2003/0135644 A1 *  7/2003   Barrett ................ H04Q 3/0062
                                                  709/238
(Continued)

FOREIGN PATENT DOCUMENTS

CN         201682491 U       12/2010
CN         103546353      *   1/2014
(Continued)

OTHER PUBLICATIONS

The World Intellectual Property Organization (WIPO) International Search Report for PCT/CN2016/099305 dated Dec. 22, 2016 5 Pages.

Primary Examiner — Afsar M Qureshi
(74) Attorney, Agent, or Firm — Anova Law Group, PLLC

(57) ABSTRACT

The present disclosure provides a mobile terminal and a wireless communication method, the mobile terminal includes: a first data card, a second data card, a first processing chip, a first logic switch, a second logic switch and a second processing chip; where the first processing chip is further configured to establish a data service link with 4G network to preform data service transmission, upon the condition that the first data card or the second data card connecting with the first processing chip; the second processing chip is further configured to establish a data service link with 4G network to preform data service transmission,
(Continued)

upon the condition that the first data card or the second data card connecting with the second processing chip.

20 Claims, 7 Drawing Sheets

(51) Int. Cl.
    *H04W 84/04*           (2009.01)
    *H04W 88/02*           (2009.01)
    *H04W 88/06*           (2009.01)

(56) References Cited

U.S. PATENT DOCUMENTS

2008/0130645 A1* 6/2008 Deshpande ......... H04L 41/0631
                                                  370/392
2012/0122514 A1* 5/2012 Cheng ................... H04W 48/18
                                                    455/524
2012/0249624 A1* 10/2012 Roth ........................ B41J 2/32
                                                        347/2
2014/0024387 A1* 1/2014 Ra ....................... H04L 63/0853
                                                  455/452.1
2016/0381191 A1* 12/2016 Marque ..................... G06F 9/54
                                                     709/226
2017/0250481 A1* 8/2017 Zhu ........................ H01R 12/71

FOREIGN PATENT DOCUMENTS

| | | | |
|---|---|---|---|
| CN | 103546353 A | | 1/2014 |
| CN | 103763760 A | | 4/2014 |
| CN | 104363580 A | | 2/2015 |
| CN | 201410737818 | * | 4/2015 |
| CN | 104902528 A | | 9/2015 |
| KR | 20040030253 | * | 11/2004 |
| WO | 2013097444 A1 | | 7/2013 |

* cited by examiner

MOBILE TERMINAL AND WIRELESS COMMUNICATION METHOD

CROSS-REFERENCE TO RELATED APPLICATIONS

This application is a national phase entry under 35 U.S.C. § 371 of International Application No. PCT/CN2016/099305, filed on Sep. 19, 2016, which claims priority to and benefits of Chinese Patent Application Serial No. 201510641418.5, filed with the State Intellectual Property Office of P. R. China on Sep. 30, 2015, and Chinese Patent Application Serial No. 201510719487.3, filed with the State Intellectual Property Office of P. R. China on Oct. 30, 2015, the entire content of all of which is incorporated herein by reference.

FIELD OF THE DISCLOSURE

The present disclosure generally relates to the field of communication technology and, more particularly, relates to a mobile terminal and wireless communication method.

BACKGROUND

With the development of the mobile communication technology, advanced cellular networks, such as networks based on LTE standard (Long Term Evolution, a standard used by some fourth generation (4G) networks), are being deployed all over the world. Because of the introduction of key technologies including OFDM (Orthogonal Frequency Division Multiplexing) and MIMO (Multi-Input & Multi-Output), the LTE standard can be used to significantly increase spectral efficiency and data transfer rates.

On the other hand, simultaneously with the increase of network rate and frequency band utilization ratio, the appearance of multi-mode terminal (terminals with two subscriber identity modules, such as dual-card dual-link terminals) enables users to establish data service links while standby for voice services.

However, the current multi-mode terminal can only achieve that one of the subscriber identity modules (SIM) uses a 4G (e.g., LTE) network and its data services, and the other identity module can only use the third generation or second generation (3G/2G) services.

Therefore, the current terminal often cannot support both of two subscriber identity modules using LTE networks simultaneously, which affects the user experience. The current technology has defects and needs to be improved.

BRIEF SUMMARY OF THE DISCLOSURE

The main objective of the embodiments of the present disclosure is to provide a mobile terminal and a wireless communication method, so as to solve the problem that the current mobile terminal cannot support both of two subscriber identity modules using 4G network.

To achieve the above objective, the embodiments of the present disclosure provide a mobile terminal. The mobile terminal includes a first data card and a second data card, and further includes:
  a first processing chip configured to provide a user interface, receive a user operation instruction, and output a first control instruction and a second control instruction based on the user operation instruction;
  a second processing chip;
  a first logic switch configured to turn on a connection path between the first data card and the first processing chip or a connection path between the first data card and the second processing chip according to the first control instruction;
  a second logic switch configured to turn on a connection path between the second data card and the first processing chip or a connection path between the second data card and the second processing chip according to the second control instruction;
  wherein the first processing chip is further configured to establish a data service link with 4G network to preform data service transmission, upon the condition that the first data card or the second data card connecting with the first processing chip;
  wherein the second processing chip is further configured to establish a data service link with 4G network to preform data service transmission, upon the condition that the first data card or the second data card connecting with the second processing chip.

In another embodiment of the present disclosure, the first processing chip and the second processing chip comprise high-speed data interface, and the high-speed data interface of the first processing chip is connected with the high-speed data interface of the second processing chip to establish a high-speed data transmission channel.

The second processing chip is further configured to transmit network data to the first processing chip through the high-speed data transmission channel.

In another embodiment of the present disclosure, the high-speed data interface is a USB (Universal Serial Bus) interface, SDIO (Secure Digital Input and Output Card) interface, or HSIC (High-Speed Inter-Chip) interface.

In another embodiment of the present disclosure, the first processing chip and the second processing chip further comprise a low speed data interface, and the low speed data interface of the first processing chip is connected with the low speed data interface of the second processing chip to establish a low speed data transmission channel.

The first processing chip is further configured to suspend the high-speed data interface and transmit data through the low speed data transmission channel upon the condition that no network data is transmitted.

In another embodiment of the present disclosure, the low speed data interface is a UART (Universal Asynchronous Receiver/Transmitter) interface, 1-wire Bus interface, I2C (Inter-Integrated Circuit) interface, or SPI (Serial Peripheral Interface) interface.

In another embodiment of the present disclosure, the first processing chip and the second processing chip further comprise status detection interface, the status detection interface of the first processing chip is connected with the status detection interface of the second processing chip to establish a status detection channel, and the first processing chip and the second processing chip transmit status information through the status detection channel.

In another embodiment of the present disclosure, the status detection channel is bidirectional or unidirectional GPIO interface.

In another embodiment of the present disclosure, the mobile terminal performs wireless communication based on Long Term Evolution (LTE).

In another embodiment of the present disclosure, the first data card is a first subscriber identity module, and the second data card is a second subscriber identity module.

In another embodiment of the present disclosure, an application processing module of the first processing chip and a second protocol stack of the second processing chip transmit control signal, status information, and data.

According to another aspect, the embodiments of the present disclosure provide a wireless communication method, comprising:

receiving a user operation instruction, and outputting a first control instruction and a second control instruction based on the user operation instruction;

turning on a connection path between the first data card and the first processing chip or a connection path between the first data card and the second processing chip, according to the first control instruction;

turning on a connection path between the second data card and the first processing chip or a connection path between the second data card and the second processing chip, according to the second control instruction;

establishing, by the first processing chip, a data service link with 4G network to perform data service transmission, upon the condition that the first data card or the second data card connecting with the first processing chip;

establishing, by the second processing chip, a data service link with 4G network to perform data service transmission, upon the condition that the first data card or the second data card connecting with the second processing chip.

In another embodiment of the present disclosure, the method further comprising:

establishing a high-speed data transmission channel, wherein a high-speed data interface of the first processing chip is connected with a high-speed data interface of the second processing chip; and transmitting network data, by the second processing chip, to the first processing chip through the high-speed data transmission channel.

In another embodiment of the present disclosure, the high-speed data interface is a USB interface, SDIO interface, or HSIC interface.

In another embodiment of the present disclosure, the method further comprising:

establishing a low speed data transmission channel, wherein a low speed data interface of the first processing chip is connected with a low speed data interface of the second processing chip;

suspending on the high-speed data interface and transmitting data through the low speed data transmission channel, by the first processing chip, upon the condition that no network data is transmitted.

In another embodiment of the present disclosure, the low speed data interface is a UART interface, 1-wire Bus interface, I2C interface, or SPI interface.

In another embodiment of the present disclosure, the method further comprising:

establishing a status detection channel, wherein a status detection interface of the first processing chip is connected with a status detection interface of the second processing chip; and transmitting status information through the status detection channel, by the first processing chip and the second processing chip.

In another embodiment of the present disclosure, the status detection channel is a bidirectional or unidirectional GPIO interface.

In another embodiment of the present disclosure, the mobile terminal performs wireless communication based on Long Term Evolution.

In another embodiment of the present disclosure, the first data card is a first subscriber identity module, and the second data card is a second subscriber identity module.

In another embodiment of the present disclosure, the method further comprising: transmitting control signal, status information and data, by an application processing module of the first processing chip and a second protocol stack of the second processing chip.

In the present disclosure, by adding a protocol stack and a radiofrequency module, and controlling a first protocol stack and a second protocol stack by a same application processing module, it can support for dual 4G, and improve user experiences. That is, the present disclosure can support dual 4G for data service transmission, support that when one data card is performing 4G transmission while another data card is performing CS (Circuit Switch) voice services, or when one data card is performing 4G transmission and voice services while another data card is also performing 4G transmission, greatly improving the data transmission rate and user experience. Further, the data card is switched through the logic switch, so that the CS voice services of the first data card and the second data card can be processed by the first processing chip and, thus, there needs only one codec and one digital processing chip, and there is no need for two processing chips to perform voice interaction logic and to perform voice data transmission, saving the cost of the software and the hardware. According to the wireless communication method in the embodiments of the present disclosure, the data flow allowance of the two data cards can be fully utilized, so that the two data cards can use the 4G network to upload or download a same task or different tasks simultaneously, doubling the speed of uploading or downloading, and significantly improving the user experience.

The realization, functional characteristics, and advantages of the objectives of the present disclosure will be further described with reference to the accompanying drawings.

DETAILED DESCRIPTION

It should be understood that the specific embodiments described herein are only used to explain the present disclosure and are not intended to limit the present disclosure.

Figure 1:
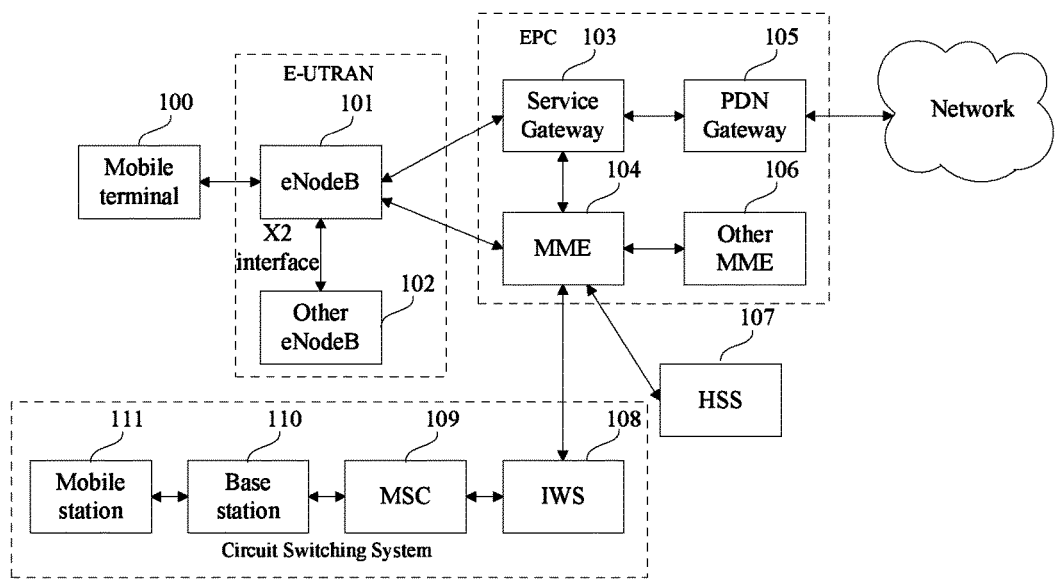
FIG. 1 is a schematic diagram of the LTE network architecture.

FIG. 1 is schematic diagram of the LTE network architecture according to one embodiment of the present disclosure. The LTE network architecture according to one embodiment of the present disclosure comprising: one or more mobile terminal 100 (also called UE (user equipment)), an E-UTRAN (Evolved UMTS Terrestrial Radio Access Network) (not labeled in FIG. 1), an EPC (Evolved Packet Core) (not labeled in FIG. 1), an HSS (Home Subscriber Server) 107, a network (such as internet) (not labeled in FIG. 1) and Circuit Switching System (not labeled in FIG. 1).

The E-UTRAN comprising eNodeB 101 and other eNodeB 102. The eNodeB 101 provides protocol termination towards the user plane and the control plane of the mobile terminal 100. The eNodeB 101 can connect with other eNodeB via an X2 interface. The eNodeB 101 can also be referred to as a base station, a base transceiver station, a radio base station, a radio transceiver, a transceiver function, a basic service set, an extended service set, or some other suitable terminology. The eNodeB 101 provides the mobile terminal 100 with an access point to the EPC.

The eNodeB 101 connects with the EPC via an S1 interface. The EPC comprises a MME (Mobility Management Entity) 104, other MME 106, a Service Gateway 103, and a Packet Data Network (PDN) Gateway 105. The MME 104 is a control node that processing signals between the mobile terminal 100 and the EPC. The MME 104 provides bearer and connection management. All of the user IP packets are delivered through the Service Gateway 103, and the Service Gateway 103 connects to the PDN gateway 105. The PDN gateway 105 provides mobile terminal IP address distribution and some other functions. The PDN gateway 105 is connected to a network, such as the Internet.

The Circuit Switching System comprises an IWS (Interworking Solution Module) 108, an MSC (Mobile Switching Center) 109, a base station 110 and a mobile station 111. In one embodiment, the circuit Switching System can communicate with the EPS through the IWS and the MME.

The circuit switching system includes an Interworking Solutions Module (IWS) 108, a Mobile Switching Center (MSC) 109, a base station 110 and a mobile station 111. In one aspect, the circuit-switched system can communicate with EPS through IWS and MME.

Embodiment One

Figure 2:
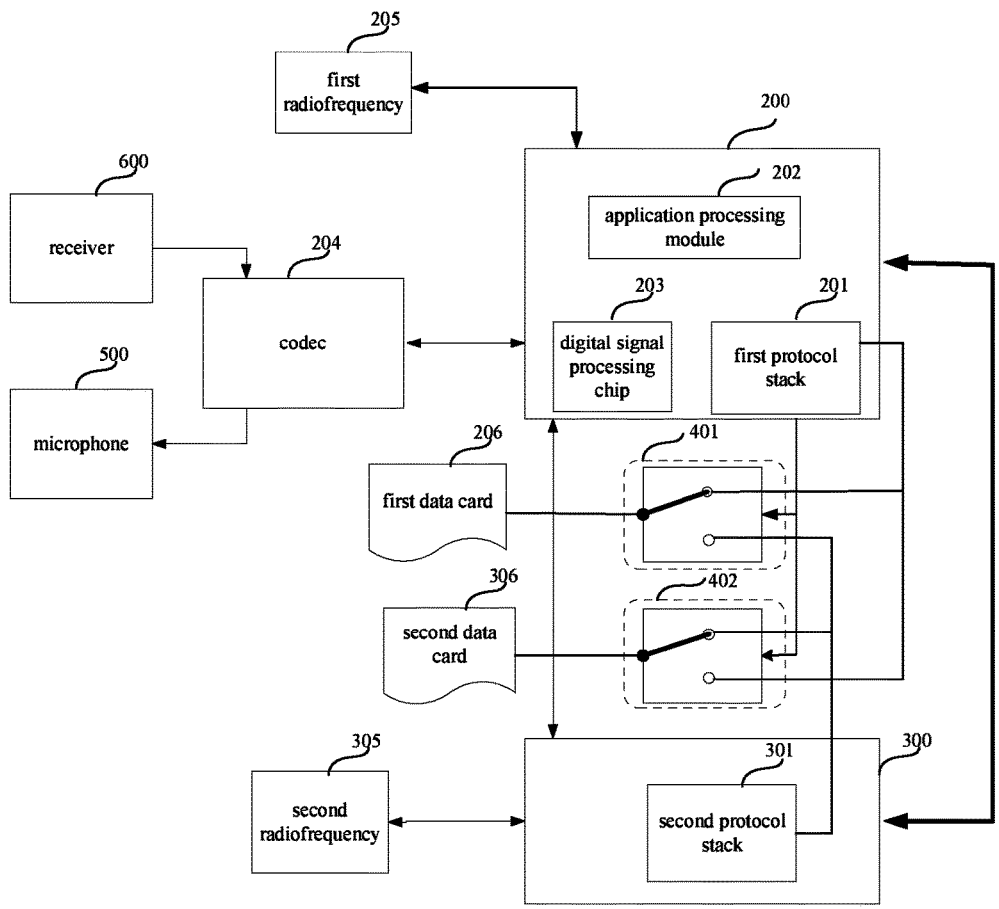
FIG. 2 is a schematic diagram of a mobile terminal according to the first embodiment of the present disclosure.

Referring to FIG. 2, a schematic diagram of a mobile terminal according to one embodiment of the present disclosure. In one embodiment of the present disclosure, the mobile terminal 100 can perform wireless communication based on Long Term Evolution (LTE), and can support for dual LTE.

Specifically, referring to FIG. 2, according to one embodiment of the present disclosure, the mobile terminal comprises: a first processing chip 200, a second processing chip 300, a first radio-frequency 205, a second radio-frequency 305, a first data card 206, a second data card 306, a codec 204, a first logic switch 401, a second logic switch 402, a receiver 600 and a microphone 500. Further, the first processing chip 200 comprises an application processing module 202, a digital processing chip 203, and a first protocol stack 201. The second processing chip comprises a second protocol stack 301.

It should be understood that, according to the embodiment of the present disclosure, the data card is a SIM (Subscriber Identity Module). The first data card is a first subscriber identity module, and the second data card is a second subscriber identity module.

It should be understood that the digital signal processing chip 203 can also be implemented by a chip independent of the first processing chip 200.

Figure 3:
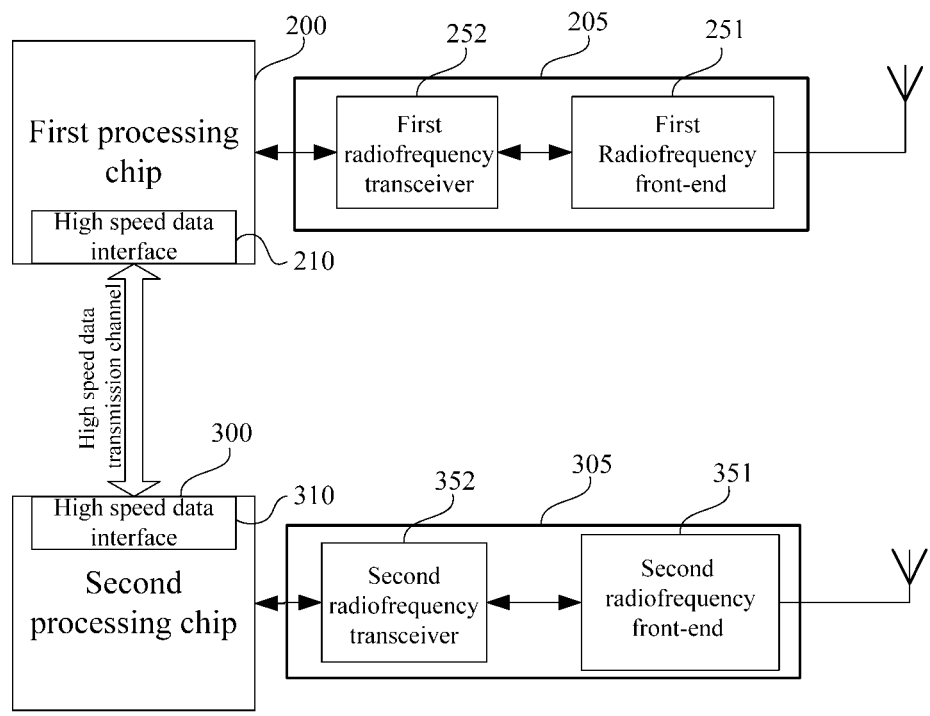
FIG. 3 is a schematic diagram of connection of the first processing chip and the second processing chip according to the first embodiment of the present disclosure.

FIG. 3 is a schematic diagram of connection of the first processing chip and the second processing chip according to one embodiment of the present disclosure. In an embodiment of the present disclosure, the first processing chip 200 connects with the first radio-frequency 205, and the first radio-frequency 205 comprises a first radio-frequency front-end 251 and a first radio-frequency transceiver 252. The second processing chip 300 connects with the second radio-frequency 305, and the second radio-frequency 305 comprises a second radio-frequency front-end 351 and a second radio-frequency transceiver 352. Each of the fist processing chip 200 and the second processing chip 300 both comprise a high-speed data interface (210, 310), and the high-speed data interface 210 of the first processing chip 200 is connected with the high-speed data interface 310 of the second processing chip 300 to establish a high-speed data transmission channel. The first processing chip 200 communicates with the second processing chip 300 through the high-speed data transmission channel, in order to realize the definition and transmission of the control signal between the two processing chips. For instance, to control the hibernation, wake up, synchronization of the two processing chips and to control the start-up sequence of the chips when power on or power off.

Through the high-speed data transmission channel, the application processing module 202 of the first processing chip 200 exchange control signal, status information, and data with the second protocol stack 301 of the second processing chip 300. For instance, the second processing chip 300 transmits the acquired network data (such as web content, video and audio data) to the first processing chip 200 through the high-speed data transmission channel, and the first processing chip 200 transmits the control signal to the second processing chip 300 through the high-speed data transmission channel, so as to set and control the operation of the second processing chip 300. The first processing chip 200 acquires the status information of the second processing chip 300 through the high-speed data transmission channel, such as signal strength information, crash fault information and the like, in order to avoid conflicts and response fault.

Considering the downlink rate of the LTE network is about 150 Mbps, the high-speed data transmission channel needs sufficient bandwidth and data transmission capability, in order to achieve receiving and transmitting the data of the second processing chip 300 in time (that is, no buffering), the high-speed data transmission channel can use a USB interface, an SDIO interface, an HSIC interface, and/or other high-speed data interface.

Figure 4:
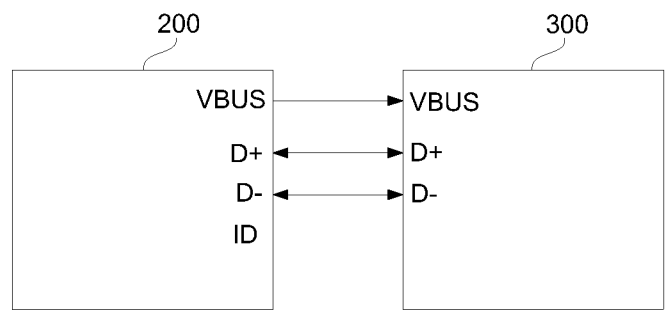
FIG. 4 is a schematic diagram of connection of the high-speed data interface of the first processing chip and the second processing chip according to one embodiment of the present disclosure.

FIG. 4 is a schematic diagram of connection of the high-speed data interface of the first processing chip and the second processing chip according to one embodiment of the present disclosure. Referring to FIG. 4, in one embodiment, the high-speed data interface (210, 310) is an USB interface, and the data throughput rate of USB 2.0 can be up to 480 Mbps, which can meet the data transfer requirement without any significant delay. The USB interface is in the host-and-device mode, that is, a master-slave mode. In this embodiment, the first processing chip 200 is a host and the second processing chip 300 is a device. Because the first processing chip 200 is a host, the ID pin on the hardware can be suspended, and it can be configured to a host on the software. The first processing chip 200 applies a VBUS voltage (typically 5.0V) to the second processing chip 300, and triggers the second processing chip 300 to interrupt. The second processing chip 300 applies a bias voltage of 3.3V on the D+ as a start of signal enumeration, and then performs data transmission according to the USB 2.0 protocol specification.

In this embodiment of the present disclosure, the two protocol-stacks (the first protocol stack 201 and the second protocol stack 301) are both controlled and configured by the application processing module 202.

The data cards (the first data card 206 and the second data card 306) are configured to connect and exchange information with the mobile terminal, to provide relevant data required by mobile communication services (CS voice service, PS data service, and PS voice service), to store user information, messages, and to execute authentication algorithms generate encryption keys and so on.

When the data card interacts with the mobile terminal, the signal that detects whether the data card exists is generated only at the instant when the mobile terminal powers on. When the data card is not detected during power-on, a message "Insert Data Card" may be prompted. After the mobile terminal is powered on, the mobile terminal communicates with the data card every 28 seconds to complete some regular communication checks (such as, whether the data card is in position, etc.).

The first data card 206 and the second data card 207 can be used to manage different users associated with different or same technology standard. In a specific non-limiting embodiment, the technology standard can be 2G communication technology (such as GSM, GPRS, EDGE), 3G communication technology (such as WCDMA, TDS-CDMA), 4G communication technology (such as LTE, TD-LTE) or any other mobile communication technology (such as 4G, 4.5G, etc.).

The wireless accessing technology involved with the first radio-frequency 205 and the second radio-frequency 305 can be LTE, GSM, GPRS, CDMA, EDGE, WLAN, CDMA-2000, TD-SCDMA, WCDMA and WIFI, etc.

In one embodiment of the present disclosure, the technology standard managed by the first data card 206 and the second data card 306 are both LTE standard, the wireless accessing technology involved with the first radio-frequency 205 and the second radio-frequency 305 are LTE, and then, the mobile terminal according to the embodiment of the present disclosure can support dual LTE.

The internal framework of the application processing module 202 comprises an application layer, a framework layer and the like, and the application processing module 202 can perform complex logic operation and task allocation. In one embodiment, the application processing module 202 may be an Android operation system and various android packages based on the Android operation system.

In one embodiment of the present disclosure, the application processing module 202 applies an interactive interface for the user, and transmits an operation instruction inputted by the user (for instance, a user operation instruction about accessing internet or making calls input by the user through the interface) to the first protocol stack 201 or the second protocol stack 301.

The first protocol stack 201 and the second protocol stack 301 comprises various network protocols, such as protocol codes in LTE/WCDMA/GSM/TDSCEMA/1X/CDMA/EVDO and other protocol standards that are specified in the communication standard. These standard protocols are mandatory for the mobile terminal to interact with the carrier's network (such as, surfing through data flow, making phone call over VOLTE or CS circuit domain, etc).

Figure 5:
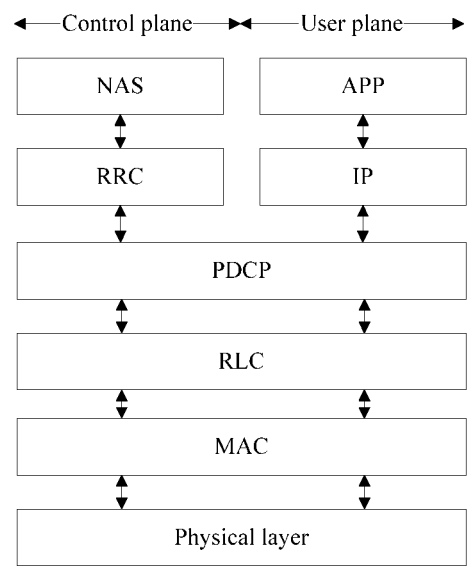
FIG. 5 is a schematic diagram of wireless protocol architecture for the user plane and the control plane in the LTE network.

FIG. 5 is a schematic diagram of wireless protocol architecture for the user plane and the control plane in the LTE network. Referring to FIG. 5, the wireless protocol framework applied for mobile terminal and eNodeB as illustrated comprises three layers: layer 1, layer 2, and layer 3. The layer 1 comprises a physical layer. The layer 2 comprises a MAC (Media Access Control) sublayer, an RLC (Radio Link Control) sublayer and PDCP (Packet Data Convergence Protocol) sublayer. The layer 3 comprises an RRC (Radio Resource Control), NAS (Non-Access Stratum), an APP (Application Layer), and an IP (Internet Protocol Layer), etc.

The physical layer is the lowest layer configured to implement various physical layer signal processing functions.

The layer 2 is above the physical layer and configured to manage the links between the mobile terminal and eNodeB over the physical layer 506.

The PDCP sublayer provides multiplexing between different radio bearers and logic channel. The PDCP sublayer also provides header compression of upper layer data packets to reduce radio transmission overhead, provides security by digitizing data packets, and provides support for handoff of mobile terminal between various eNodeBs.

The RLC sublayer provides segmentation and reassembly of upper data packets, retransmission of lost data packets and reordering of data packets to compensate for out of order reception due to HARQ (hybrid automatic repeat request).

The MAC sublayer provides multiplexing between logic channel and transport channel. The MAC sublayer is also managed for allocating various radio resources (such as resource blocks) in one cell among mobile terminals. The MAC sublayer is also managed for HARQ operation.

The RRC sublayer is manager for acquiring radio resources (such as radio bearers) and configuring the lower layers by using RRC signals between the eNodeB and the mobile terminal.

The NAS sublayer supports signal and data transmission between the mobile terminal and the core network (EPC).

The digital signal processing chip 203 comprises suitable hardware, logic implement, circuitry and/or code, configured to perform audio signal processing, such as, echo suppression, noise suppression and the like during a call.

The Codec 204 comprises suitable hardware, logic implement, circuitry and/or code, configured to perform A/D and D/A conversation.

The first radio frequency 205 is configured to process and transmit the data transmitted by the first protocol stack 201 to eNodeB 101 (base station network), and to process and transmit the data processed by eNode B 101 to the first protocol stack 201.

The second radio frequency 305 is configured to process and transmit the data transmitted by the second protocol stack 301 to eNodeB 101 (base station network), and to process and transmit the data processed by eNode B 101 to the second protocol stack 301.

The receiver 600 comprises suitable hardware, logic implement, circuitry and/or code, configured to output a sound signal.

The microphone 500 comprises suitable hardware, logic implement, circuitry and/or code, configured to collect voice signals.

The first logic switch 401 is connected to the first processing chip 200 and the first data card 206, respectively. The first logic switch 401 is configured to, under the first control instruction outputted by the first processing chip 200, connect the first data card 206 to the first protocol stack 201 or the second protocol stack 301.

The second logic switch 402 is connected to the first processing chip 200 and the second data card 306, respectively. The first logic switch 402 is configured to, under the second control instruction outputted by the first processing chip 200, connect the second data card 306 to the first protocol stack 201 or the second protocol stack 301.

In one embodiment, the first processing chip 200 controls the first logic switch 401 and the second logic switch 402 by outputting a high-low level voltage. For instance, when the first processing chip 200 outputs a high-level voltage, the first logic switch 401 is turned on to connect the first data card 206 with the first protocol stack 201, and when the first processing chip 200 outputs a low-level voltage, the first data card 206 connects with the second protocol stack 301. Or when the first processing chip 200 outputs a high-level voltage, the second logic switch 401 is turned on to connect the second data card 306 with the first protocol stack 201, and when the first processing chip 200 outputs a low-level voltage, the second data card 306 connects with the second protocol stack 301.

In the first embodiment of the present disclosure, the first data card 206 can stay in the PS (Packet Switching) domain and the CS (Circuit Switching) domain of the first network through the first protocol stack 201 under the condition that the first data card 206 connects with the first protocol stack 201. Thus, the first data card 206 can perform CS voice and PS data services over the first network.

Similarly, the second data card 306 can stay in the PS (Packet Switching) domain and the CS (Circuit Switching) domain of the first network through the first protocol stack 201 under the condition that the second data card 306 connects with the first protocol stack 201. Thus, the second data card 306 can perform CS voice and PS data services over the first network.

The first data card 206 can stay in the PS domain of the second network through the second protocol stack 301 under the condition that the first data card 206 connects with the second protocol stack 301. Thus, the first data card 206 can perform PS data services over the second network.

Similarly, the second data card 306 can stay in the PS domain of the second network through the second protocol stack 301 under the condition that the second data card 306 connects with the second protocol stack 301. Thus, the second data card 306 can perform PS data services over the second network.

The first network and the second network can be different networks belonging to different operators, or can be same or different networks belonging to one operator. In one embodiment of the present disclosure, the first network and the second network are both 4G networks (such as, LTE).

In one embodiment of the present disclosure, the first protocol stack 201 supports both of the PS data services and CS voice services, the second protocol stack 301 only supports PS data services. When a data card (the first data card 206 or the second data card 306) connected to the second protocol stack 301 has a CS voice service, the first processing chip 200 controls the logic switch (the first logic switch 401 or the second logic switch 402) to enable the corresponding data card to connect with the first protocol stack 201, and to implement CS voice service.

It should be understood that, in the case of a PS data service, it is transmitted according to the transmission of the PS data service.

Figure 6:
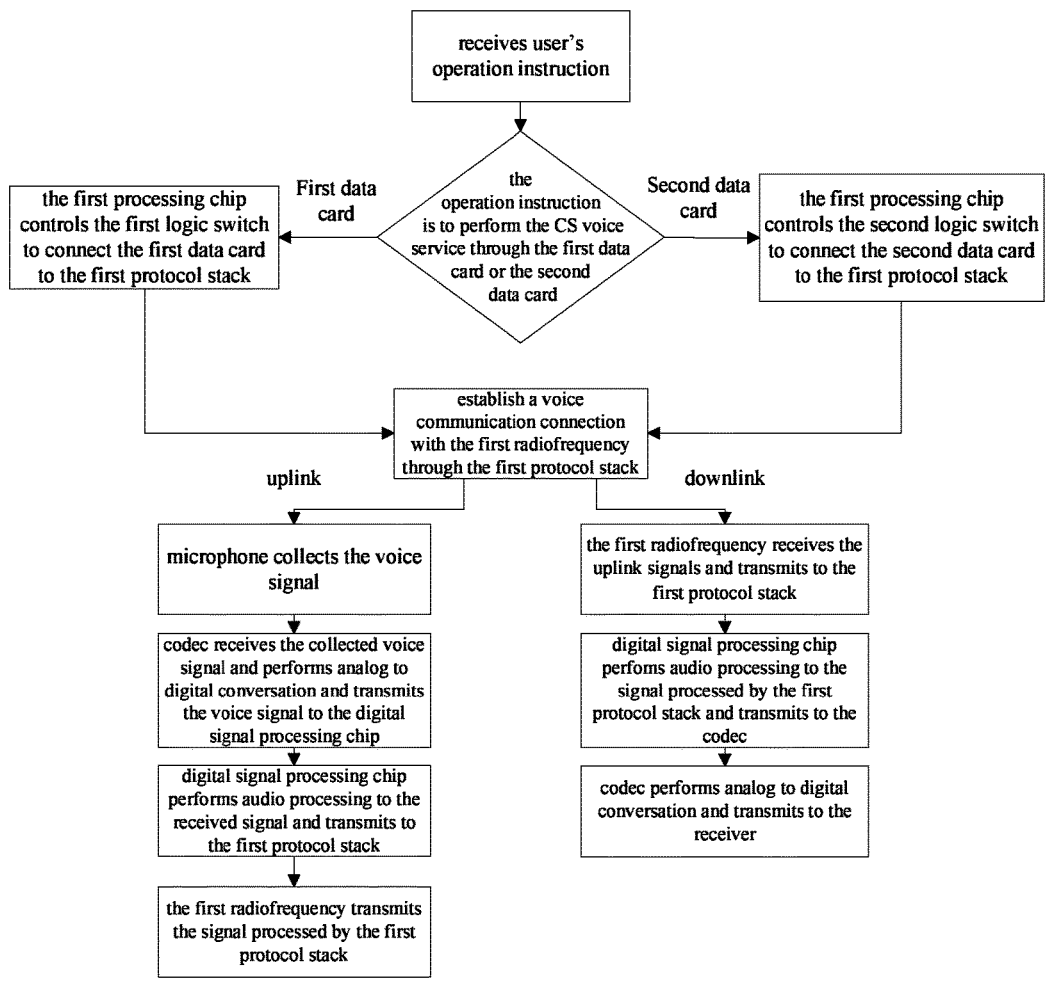
FIG. 6 is a flowchart of voice transmission of the mobile terminal according to the embodiments of the present disclosure.

Referring to FIG. 6, the application processing module 202 receives a user operation instruction. If the operation instruction is to perform the CS voice service through the first data card 206, then the first processing chip 200 outputs the first control instruction to control the first logic switch 401 to connect the first data card 206 with the first protocol stack 201. The process of performing CS voice services through the first data card 206 comprises the followings.

Firstly, a voice communication connection is established by: the application processing module 202 transmits the operation instruction to the first protocol stack 201, and establishes a voice communication connection with the called party through certain processes including sending an RRC connection request to eNodeB through the first radio-frequency 205.

After the voice communication connection is established, the voice uplink transmission process is as follows: the microphone 500 collects the voice signal, the codec 204 receives the collected voice signal and performs analog-to-digital conversation and transmits the voice signal to the digital signal processing chip 203, the digital signal processing chip 203 performs audio processing to the received signal and transmits to the first protocol stack 201, the first radio-frequency 205 transmits the signal processed by the first protocol stack 201. The voice downlink transmission process is as follows: the digital signal processing chip 203 performs audio processing to the signal processed by the first protocol stack 201 and transmits the signal to the codec 204, and the codec 204 performs digital-to-analog conversation and transmits the converted signal to the receiver 600.

Referring to FIG. 6, the application processing module 202 receives a user operation instruction. If the operation instruction is to perform the CS voice service through the second data card 306, then the first processing chip 200 outputs the second control instruction to control the second logic switch 402 to connect the second data card 306 with the first protocol stack 201. The process of performing CS voice services through the second data card 306 comprises the followings.

Firstly, a voice communication connection is established by: the application processing module 202 transmits the operation instruction to the first protocol stack 201, and establishes a voice communication connection with the called party through certain processes including sending an RRC connection request to eNodeB through the first radio-frequency 205.

After the voice communication connection is established, the voice uplink transmission process is as follows: the microphone 500 collects the voice signal, the codec 204 receives the collected voice signal and performs analog-to-digital conversation and transmits the voice signal to the digital signal processing chip 203, the digital signal processing chip 203 performs audio processing to the received signal and transmits to the first protocol stack 201, the first radio-frequency 205 transmits the signal processed by the first protocol stack 201. The voice downlink transmission process is as follows: the digital signal processing chip 203 performs audio processing to the signal processed by the first protocol stack 201 and transmits to the codec 204, the codec 204 performs digital-to-analog conversation and transmits to the receiver 600.

Figure 7:
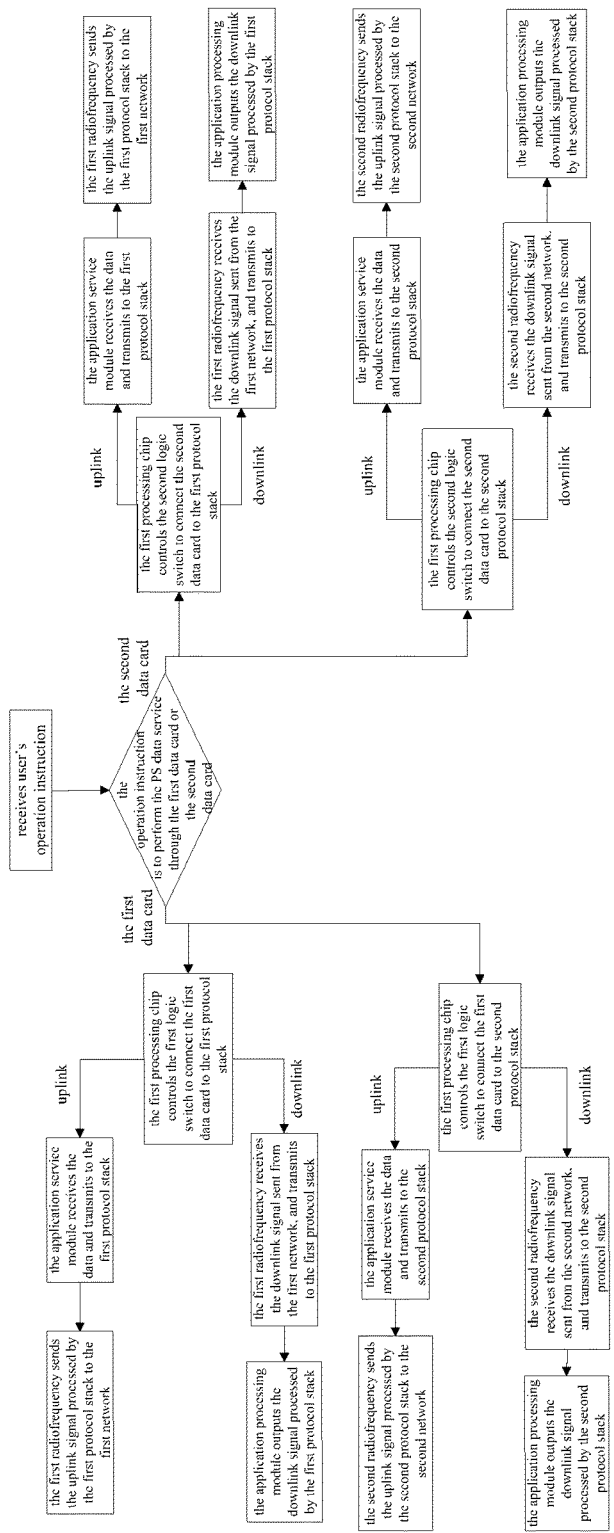
FIG. 7 is a flowchart of data transmission of the mobile terminal according to one embodiment of the present disclosure.

Referring to FIG. 7, the application processing module 202 receives a user operation instruction. If the operation instruction is to perform the PS data service through the first data card 206, then the first processing chip 200 outputs the first control instruction to control the first logic switch 401 to turn on a connection path between the first data card 206 and the first protocol stack 201, and outputs a second control instruction to control the first logic switch 401 to turn on a connection path between the first data card 206 and the second protocol stack 301, both of the connection paths can perform transmission of PS data services.

In other embodiments of the present disclosure, if the connection path between the first data card 206 and the first protocol stack 201 is turned on, then the transmission flow of PS data services is as follows: the application service module receives the data and transmits to the first protocol stack; the first radio-frequency sends the uplink signal processed by the first protocol stack to the first network (4G network), receives the downlink signal sent from the first network, and transmits to the first protocol stack; and the application processing module outputs the downlink signal processed by the first protocol stack.

If the connection path between the first data card 206 and the second protocol stack 301 is turned on, then the transmission flow of PS data services is as follows: the application service module receives the data and transmits to the second protocol stack; the second radio-frequency sends the uplink signal processed by the second protocol stack to the LTE network, receives the downlink signal sent from the LTE network, and transmits to the second protocol stack; and the application processing module outputs the downlink signal processed by the second protocol stack.

Referring to FIG. 7, if the operation instruction is to perform the PS data service through the second data card 306, then the first processing chip 200 outputs the first control instruction to control the second logic switch 402 to turn on a connection path between the second data card 306 and the first protocol stack 201, and outputs a second control instruction to control the second logic switch 402 to turn on a connection path between the second data card 306 and the second protocol stack 301, both of the connection paths can perform transmission of PS data services.

In other embodiments of the present disclosure, if the connection path between the second data card 306 and the first protocol stack 201 is turned on, then the transmission flow of PS data services is as follows: the application service module receives the data and transmits to the first protocol stack; the first radio-frequency sends the uplink signal processed by the first protocol stack to the first network (4G network), receives the downlink signal sent from the first network, and transmits to the first protocol stack; and the application processing module outputs the downlink signal processed by the first protocol stack.

If the connection path between the second data card 306 and the second protocol stack 301 is turned on, then the transmission flow of PS data services is as follows: the application service module receives the data and transmits to the second protocol stack; the second radio-frequency sends the uplink signal processed by the second protocol stack to the second network (4G network), receives the downlink signal sent from the second network (4G network), and transmits to the second protocol stack; and the application processing module outputs the downlink signal processed by the second protocol stack. After the mobile terminal is powered on, because the mobile terminal communicates with the data card every 28 seconds, whether the data card is in position can be confirmed to make sure that the communication is normal. The communication every 28 seconds is controlled by the processing chip connected with the data card. For instance, the processing chip sends a blank data to the data card, and the data card is in position if a response is received; otherwise, the data card is not in position.

In one embodiment of the present disclosure, the first processing chip 200 is further configured to send information to the first data card 206 or the second data card 306 in a predetermined interval to confirm whether the data card is in position.

When confirming whether the first data card 206 is in position (by default the first data card 206 is to be connected with the first processing chip 200), if the first data card 206 is not connected with the first processing chip 200, the first processing chip 200 is further configured to control the first logic switch 401 to turn on the connection path between the first data card 206 and the first processing chip 200.

When confirming whether the second data card 306 is in position (by default the second data card 306 is to be connected with the first processing chip 200), if the second data card 306 is not connected with the first processing chip 200, the first processing chip 200 is further configured to control the second logic switch 402 to turn on the connection path between the second data card 306 and the first processing chip 200.

Similarly, the second processing chip 300 is further configured to send information to the first data card 206 or the second data card 306 in predetermined interval to confirm whether the data card is in position.

When confirming whether the first data card 206 is in position (by default the first data card 206 should be connected with the second processing chip 300), if the first data card 206 is not connected with the second processing chip 300, the second processing chip 300 is further configured to control the first logic switch 401 to turn on the connection path between the first data card 206 and the second processing chip 300.

When confirming whether the second data card 306 is in position (by default the second data card 306 should be connected with the second processing chip 300), if the second data card 306 is not connected with the second processing chip 300, the second processing chip 300 is further configured to control the second logic switch 402 to turn on the connection path between the second data card 306 and the second processing chip 300.

For example, if the second data card 306 connected with the second processing chip is switched to connect with the first protocol stack 201 (e.g., being switched to connect with the first protocol stack 201 to perform PS data services), it is required to switch back to the second processing chip every 28 seconds. That is, the second logic switch 402 is controlled to make the second data card 306 connect to the second protocol stack, so as to complete the confirming whether the data card is in position. After the confirmation, the second data card is switched back to connect with the first processing chip to ensure the normal communication.

Similarly, if the first data card 206 connected with the first processing chip is switched to connect with the second protocol stack 301, it is required to switch back to the first processing chip every 28 seconds. That is, the first logic switch 401 is controlled to make the first data card 206 connect to the first protocol stack, so as to complete the confirming whether the data card is in position. After the confirmation, the first data card is switched back to connect with the second processing chip to ensure the normal communication.

It should be understood that the switching time of the logic switch is at millisecond level, and the time of confirming whether the card is in position is also at millisecond level. Therefore, the switching of the data card will not affect the transmission of normal services.

It should be understood that, in some embodiments, by setting priorities, the priority of the voice service is set to be higher than the priority of the data service, so as to ensure the voice service proceed normally during the confirmation of whether the data card is in position.

According to the above mentioned in-position confirming mechanism, in the mobile terminal in the embodiment of the present disclosure, when the first data card 206 is connected with the second processing chip 300 for data service transmission, the first data card 206 can also be connected with the first processing chip 200 for voice transmission, as long as to ensure that the first data card 206 is in position during the in-position confirmation.

According to the above mentioned in-position confirming mechanism, in the mobile terminal in the embodiment of the present disclosure, when the second data card 306 is connected with the second processing chip 300 for data service transmission, the second data card 306 can also be connected with the first processing chip 200 for voice transmission, as long as to ensure that the second data card 206 is in position during the in-position confirmation.

According to the above mentioned in-position confirming mechanism, in the mobile terminal in the embodiment of the present disclosure, when the first data card 206 is connected with the first processing chip 200 for data service transmission and voice services, the second data card 306 can also be connected with the second processing chip 300 for data service transmission, as long as to ensure that the first data card 206 and the second data card 306 are both in position during the in-position confirmation.

According to the above mentioned in-position confirming mechanism, in the mobile terminal in the embodiment of the present disclosure, when the second data card 306 is connected with the first processing chip 200 for data service transmission and voice services, the first data card 206 can also be connected with the second processing chip 300 for data service transmission, as long as to ensure that the first data card 206 and the second data card 306 are both in position during the in-position confirmation.

The mobile terminal according to one embodiment of the present disclosure, by adding a protocol stack and a radio-frequency module and controlling a first protocol stack and a second protocol stack by a same application processing module, can achieve support for dual 4G, and improve user experiences. The present disclosure can support dual 4G for data service transmission, support that when one data card is performing 4G transmission, another data card can perform CS (Circuit Switch) voice services, or when one data card is performing 4G transmission and voice services, another data card can also perform 4G transmission, greatly improving data transmission rate and user experience. Further, the data card is switched through the logic switch, so that the CS voice services of the first data card and the second data card can be processed by the first processing chip, and there needs only one codec and one digital processing chip, and there is no need for two processing chips to perform voice interaction logic and to perform voice data transmission, saving the cost of the software and the hardware. According to the wireless communication method in the embodiments of the present disclosure, the data flow allowance of the two data cards can be fully utilized, so that the two data cards can use the 4G network to upload or download a same task or different tasks simultaneously, doubling the speed of uploading or downloading, and significantly improving the user experience.

Embodiment Two

Figure 8:
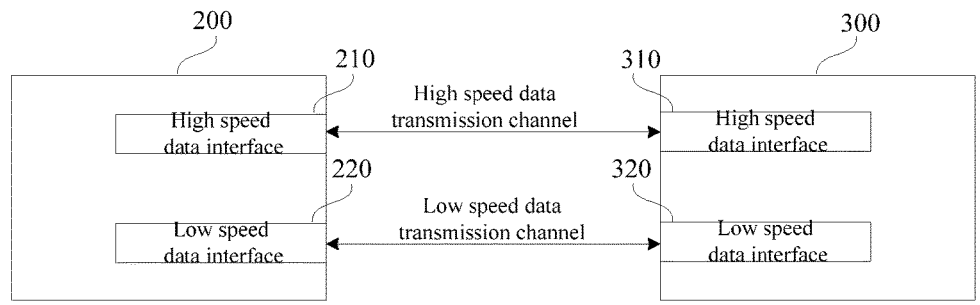
FIG. 8 is a schematic diagram of connection of the first processing chip and the second processing chip according to the second embodiment of the present disclosure.

FIG. 8 is a schematic diagram of connection of the first processing chip 200 and the second processing chip 300 according to the second embodiment of the present disclosure. Referring to FIG. 8, in one embodiment of the present disclosure, the first processing chip 200 and the second processing chip 300 both comprise a high-speed data interface (210, 310) and a low speed data interface (220, 320), the high-speed data interface 210 of the first processing chip 200 is connected with the high-speed data interface 310 of the second processing chip 300 to establish a high-speed data transmission channel, the low speed data interface 220 of the first processing chip 200 is connected with the low speed data interface 320 of the second processing chip 300 to establish a low speed data transmission channel.

The first processing chip 200 and the second processing chip 300 transmit network data through the high-speed data transmission channel, in order to achieve receiving and sending the network data in time, the high-speed interface can be a USB interface, SDIO interface, HSIC interface.

Considering the high power-consumption of the high-speed data interface, generally not less than 30 mA, when there is no network data transmission, the first processing chip 200 suspends the high-speed data interface 210, uses the low-speed data interface 220, and transmits information through the low-speed data interface. The information includes control signal and status information. The low-speed data interface (220, 320) can be UART interface, 1-wire Bus interface, I2C interface and SPI interface.

Figure 9:
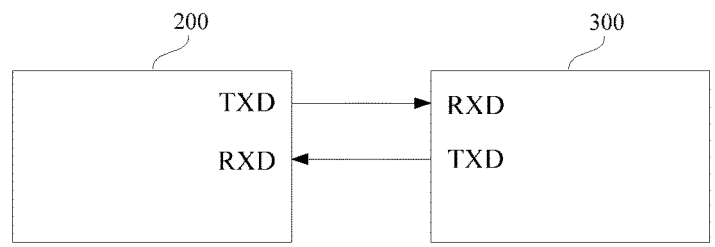
FIG. 9 is a schematic diagram of connection of the low speed data interface of the first processing chip and the second processing chip according to one embodiment of the present disclosure.

FIG. 9 is a schematic diagram of connection of the low-speed data interface of the first processing chip and the second processing chip. Referring to FIG. 9, in this embodiment, the low-speed data interface (220, 230) are UART interface. The UART (Universal Asynchronous Receiver/Transmitter) interface is a serial communication interface, and can be implemented in two-wire (TXD/RXD) or four-wire with hardware flow control (TXD/RXD/RTS/CTS), the band rates of which can be from 4800 bps to 3 Mbps, and can completely meet the needs of transmitting control signals, status information and other basic information.

The mobile terminal according to the embodiment of the present disclosure, by providing high-speed data interface (210, 310) and low-speed data interface (220, 320) on the first processing chip 200 and the second processing chip 300, transmits network data in high-speed through the high-speed data interface (210, 310), suspends the high-speed data interface (210,310) when there is no need to transmit network data, and transmits information through the low-speed data interface (220,320) which is low power, thus ensuring the high-speed transmission of the network data and also reducing power consumption.

Embodiment Three

Figure 10:
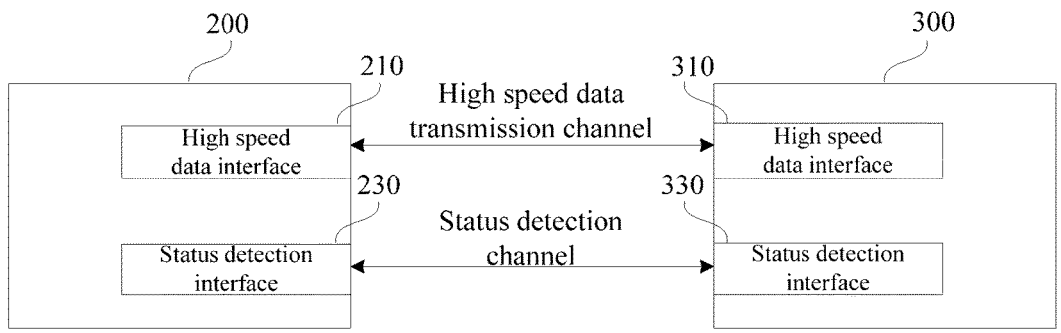
FIG. 10 is a schematic diagram of connection of the first processing chip and the second processing chip according to the third embodiment of the present disclosure.

FIG. 10 is a schematic diagram of connection of the first processing chip and the second processing chip according to the third embodiment of the present disclosure. Referring to FIG. 10, in this embodiment of the present disclosure, the first processing chip 200 and the second processing chip 300 both comprise a high-speed data interface (210, 310) and a status detection interface (230, 330), the high-speed data interface 210 of the first processing chip 200 is connected with the high-speed data interface 310 of the second processing chip 300 to establish a high-speed data transmission channel, and the status detection interface 230 of the first processing chip 200 is connected with the status detection interface 330 of the second processing chip 300 to establish a status detection channel.

The first processing chip 200 and the second processing chip 300 transmit network data, control signal, and status information (such as signal strength) through the high-speed data transmission channel, in order to achieve receiving and sending the network data in time. The high-speed interface can be a USB interface, SDIO interface, HSIC interface.

Figure 11:
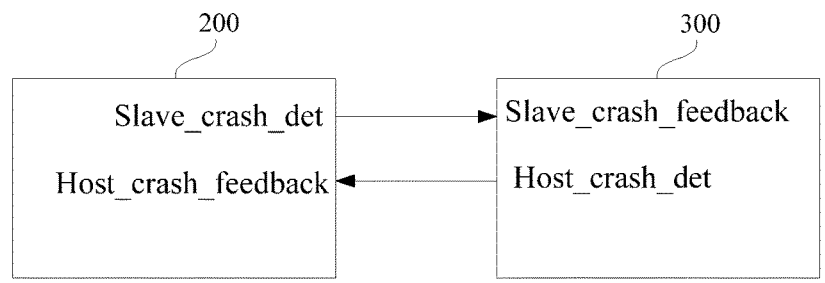
FIG. 11 is a schematic diagram of connection of the status detection interface of the first processing chip and the second processing chip according to one embodiment of the present disclosure.

The first processing chip 200 and the second processing chip 300 establish a status detection mechanism through the status detection channel, and transmit simple status information to avoid conflicts and handle faults. For instance, crash detection can be implemented: when one party detects the other party being crashed, certain actions can be taken. Because this mechanism does not need to transmit data, only needs basic information such as yes or no, there is no need to transmit information through the high-speed data transmission channel, and only the status detection channel is needed to detect whether the information is yes or no. On one hand, power consumption can be reduced; on the other hand, it can be more reliable to access simple status information. As shown in FIG. 11, one or more bidirectional or unidirectional GPIO interfaces can be used as status detection interfaces (230, 330), and the status can be identified by a high or low voltage level or pulse. For instance, a high level means yes, a low lever means no, and vice versa.

The mobile terminal according to the embodiment of the present disclosure, by providing high-speed data interface (210,310) and status detection interface (230, 330) on the first processing chip 200 and the second processing chip 300, transmits network data in high-speed through the high-speed data interface (210, 310), establishes status detection mechanism through the status detection interface (230, 330), and detects simple status information, thus ensuring the high-speed transmission of the network data, and also becoming more reliable to access simple status information.

Embodiment Four

Figure 12:
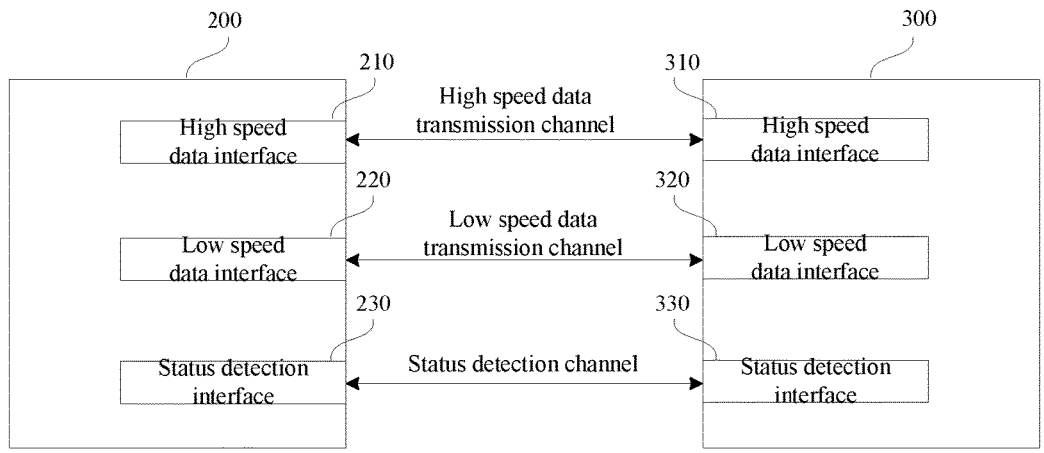
FIG. 12 is a schematic diagram of connection of the first processing chip and the second processing chip according to the fourth embodiment of the present disclosure.

FIG. 12 is a schematic diagram of connection of the first processing chip and the second processing chip according to the fourth embodiment of the present disclosure. Referring to FIG. 12, in this embodiment, the first processing chip 200 and the second processing chip 300 both comprise a high-speed data interface (210, 310), a low-speed data interface (220, 320), and a status detection interface (230, 330). The high-speed data interface 210 of the first processing chip 200 is connected with the high-speed data interface 310 of the second processing chip 300 to establish a high-speed data transmission channel, the low-speed data interface 220 of the first processing chip 200 is connected with the low-speed data interface 320 of the second processing chip 300 to establish a low-speed data transmission channel, and the status detection interface 230 of the first processing chip 200 is connected with the status detection interface 330 of the second processing chip 300 to establish a status detection channel.

The first processing chip 200 and the second processing chip 300 transmit network data through the high-speed data transmission channel, so as to receive and send the network data in time, and the high-speed interface can be a USB interface, SDIO interface, HSIC interface.

Considering the high power-consumption of the high-speed data interface, generally not less than 30 mA, when there is no network data transmission, the first processing chip 200 suspends the high-speed data interface 210 and uses the low-speed data interface 220, such that the first processing chip 200 transmits information through the low-speed data interface. The information may include control signal and status information. The low-speed data interface (220, 320) can be a UART interface, 1-wire Bus interface, I2C interface, and/or SPI interface.

The first processing chip 200 and the second processing chip 300 may establish a status detection mechanism through the status detection channel, and transmit simple status information to avoid conflicts and handle faults. For instance, crash detection may be implemented: when one party detects the other party been crash, some actions can be taken. Since this mechanism does not need to transmit data, only need basic information such as yes or no, there is no need to transmit information through the high-speed data transmission channel, only need the status detection channel to detect whether the information is yes or no. On one hand, power consumption can be reduced; on the other hand, it can be more reliable to access simple status information.

The mobile terminal according to the embodiment of the present disclosure, by providing high-speed data interface (210,310), low-speed data interface (220, 320) and status detection interface (230, 330) on the first processing chip 200 and the second processing chip 300, transmits network data in high-speed through the high-speed data interface (210, 310), suspends the high-speed data interface (210,310) when there is no need to transmit network data, and transmits information through the low-speed data interface (220, 320) which is low power. Further, the mobile terminal establishes status detection mechanism through the status detection interface (230, 330), detects simple status information, thus ensures the high-speed transmission of the network data, reduces power consumption, and also can be more reliable to access simple status information.

Embodiment Five

Figure 13:
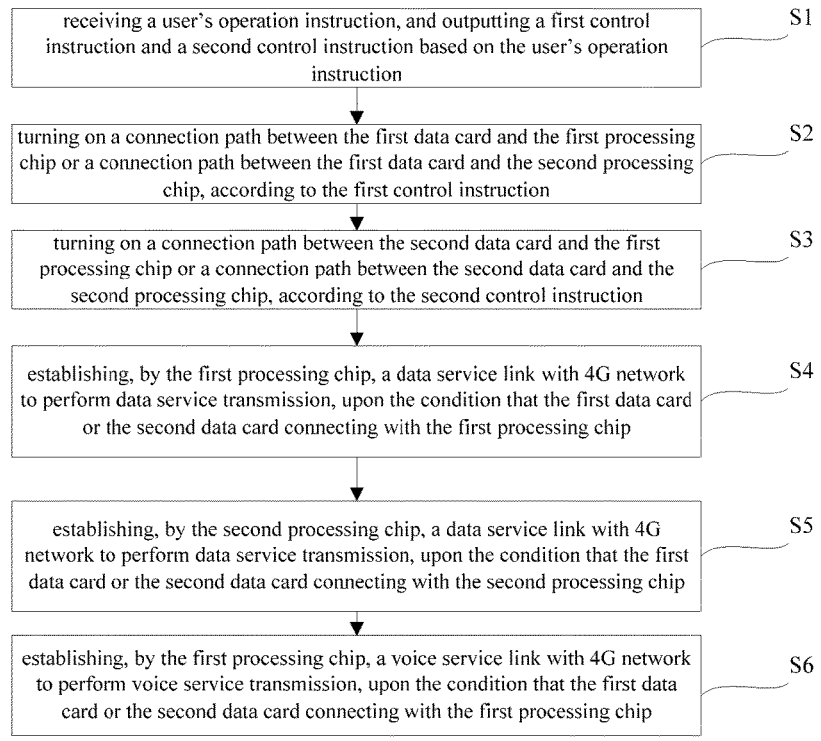
FIG. 13 is a flowchart of the wireless communication method according to the fifth embodiment of the present disclosure.

FIG. 13 is a flowchart of the wireless communication method. Referring to FIG. 13, the wireless communication method according to one embedment of the present disclosure comprising the flowing steps.

Step S1, receiving a user operation instruction, and outputting a first control instruction and a second control instruction based on the user operation instruction.

Step S2, according to the first control instruction, turning on a connection path between the first data card and the first processing chip or a connection path between the first data card and the second processing chip.

Step S3, according to the second control instruction, turning on a connection path between the second data card and the first processing chip or a connection path between the second data card and the second processing chip.

Step S4, establishing, by the first processing chip, a data service link with 4G network to perform data service transmission, upon the condition that the first data card or the second data card connecting with the first processing chip.

Step S5, establishing, by the second processing chip, a data service link with 4G network to perform data service transmission, upon the condition that the first data card or the second data card connecting with the second processing chip.

Step S6, establishing, by the first processing chip, a voice service link with 4G network to perform voice service transmission, upon the condition that the first data card or the second data card connecting with the first processing chip.

The sequence of the step S2 and step S3 is not intended to be limiting, they can be performed simultaneously, or the step S3 can be performed after the step S2, or the step S2 can be performed after the step S3.

In other embodiments of the present disclosure, the high-speed data interface of the first processing chip is connected to the high-speed data interface of the second processing chip to establish a high-speed data transmission channel; and the second processing chip transmits acquired network data to the first processing chip through the high-speed data transmission channel.

In other embodiments of the present disclosure, the low-speed data interface of the first processing chip is connected with the low-speed data interface of the second processing chip to establish a low-speed data transmission channel; and when there is no network data transmission, the first processing chip suspends the high-speed data interface, and transmits information through the low-speed data interface.

In other embodiments of the present disclosure, the status detection interface of the first processing chip is connected with the status detection interface of the second processing chip to establish a status detection channel, the first processing chip and the second processing chip transmits status information through the status detection channel.

It should be understood that, the specific implementation details of the wireless communication method of the present disclosure correspond to the mobile terminals in the first embodiment to the fifth embodiment described above, and details are not described herein again.

The wireless communication method according to the present disclosure can achieve support for dual 4G, and improves user experiences; can support dual 4G for data service transmission, greatly improves data transmission rate; and switches the data card according to the control signals, so that the CS voice services of the first data card and the second data card can be processed by the first processing chip, saves the cost of the software and the hardware. According to the wireless communication method in the embodiment of the present disclosure, the data flow of the two data cards can be fully utilized, so that the two data cards can use the 4G network to upload or download a same task or different tasks simultaneously, double increases the speed of uploading or downloading, and significantly improves the user experience.

It should be noted that in the present disclosure, the terms 'comprising', 'including' or any other variant which is intended to encompass a non-exclusive inclusion, so as to include a series of elements of process, method, material or apparatus, and not only include those elements, but also include other elements that are not explicitly listed, or the elements that are inherent to these process, method, material or apparatus. In the absence of more restrictions, the elements defined by the statement 'comprising a . . . ' do not exclude the presence of the other same elements in the process, method, material or apparatus that includes the elements.

The above described embodiments of the present disclosure are only for the sake of description and do not represent the pros and cons of the embodiments.

With the description of the above embodiments, it will be apparent to those skilled in the art that the method of the above embodiments can be realized by software plus the necessary general hardware platform, and also can be realized by the hardware, but in many cases the former is a better embodiment. Based on this understanding, the technical solution of the present disclosure, in essence, or in the form of a prior art, can be embodied in the form of a software product, the software product stored in a storage medium (such as ROM/RAM, disk, CD-ROM), and the software product includes a number of instructions for enabling a terminal device (which may be a mobile phone, a computer, a server, or a network device, etc.) to perform the method described in the various embodiments of the present disclosure.

The above is only the preferred embodiments of the present disclosure, not to limit the scope of the present invention, any equivalent structure or equivalent process using the description of the present disclosure and the accompanying drawings, or directly or indirectly used in other related technical fields, are equally included in the protection of the present disclosure.

INDUSTRIAL UTILITY

In embodiments of the present disclosure, the first processing chip is configured to establish a data service link with 4G network to preform data service transmission, upon the condition that the first data card or the second data card connecting with the first processing chip; the second processing chip is configured to establish a data service link with 4G network to preform data service transmission, upon the condition that the first data card or the second data card connecting with the second processing chip. Therefore, it can achieve support for dual 4G, and improves user experiences.

What is claimed is:

1. A mobile terminal, comprising a first data card and a second data card, and further comprising:
a first processing chip configured to provide a user interface, to receive a user operation instruction, and to output a first control instruction and a second control instruction based on the user operation instruction;
a second processing chip;
a first logic switch configured to, according to the first control instruction, turn on a connection path between the first data card and the first processing chip or a connection path between the first data card and the second processing chip; and
a second logic switch configured to, according to the second control instruction, turn on a connection path between the second data card and the first processing chip or a connection path between the second data card and the second processing chip,
wherein:
the first processing chip is further configured to, when the first data card or the second data card connecting with the first processing chip, establish a data service link with 4G network to preform data service transmission; and the second processing chip is further configured to, when the first data card or the second data card connecting with the second processing chip, establish a data service link with 4G network to preform data service transmission.

2. The mobile terminal according to claim 1, wherein:
the first processing chip and the second processing chip each includes a high-speed data interface, the high-speed data interface of the first processing chip being connected with the high-speed data interface of the second processing chip to establish a high-speed data transmission channel; and
the second processing chip is further configured to transmit network data to the first processing chip through the high-speed data transmission channel.

3. The mobile terminal according to claim 2, wherein the high-speed data interface is one of a USB interface, a SDIO interface, and an HSIC interface.

4. The mobile terminal according to claim 2, wherein:
the first processing chip and the second processing chip each includes a low-speed data interface, the low-speed data interface of the first processing chip being connected with the low-speed data interface of the second processing chip to establish a low-speed data transmission channel; and
the first processing chip is further configured to, when no network data is transmitted, suspend the high-speed data interface and transmit data through the low-speed data transmission channel.

5. The mobile terminal according to claim 4, wherein the low-speed data interface is one of a UART interface, a 1-wire Bus interface, an I2C interface, and an SPI interface.

6. The mobile terminal according to claim 2, wherein:
the first processing chip and the second processing chip each includes a status detection interface, the status detection interface of the first processing chip being connected with the status detection interface of the second processing chip to establish a status detection channel; and
the first processing chip and the second processing chip transmit status information through the status detection channel.

7. The mobile terminal according to claim 6, wherein the status detection channel is a bidirectional or unidirectional GPIO interface.

8. The mobile terminal according to claim 1, wherein the mobile terminal performs wireless communication based on Long Term Evolution (LTE) standard.

9. The mobile terminal according to claim 1, wherein the first data card is a first subscriber identity module, and the second data card is a second subscriber identity module.

10. The mobile terminal according to claim 1, wherein an application processing module of the first processing chip performs transmission of control signal, status information and data with a second protocol stack of the second processing chip.

11. A wireless communication method, comprising:
receiving a user operation instruction, and outputting a first control instruction and a second control instruction based on the user operation instruction;
turning on a connection path between a first data card and a first processing chip or a connection path between the first data card and a second processing chip, according to the first control instruction;
turning on a connection path between a second data card and the first processing chip or a connection path between the second data card and the second processing chip, according to the second control instruction;
establishing, by the first processing chip, a data service link with 4G network to perform data service transmission, upon the condition that the first data card or the second data card connecting with the first processing chip;
establishing, by the second processing chip, a data service link with 4G network to perform data service transmission, upon the condition that the first data card or the second data card connecting with the second processing chip.

12. The method according to claim 11, further comprising:
establishing a high-speed data transmission channel by connecting a high-speed data interface of the first processing chip with a high-speed data interface of the second processing chip; and
transmitting network data, by the second processing chip, to the first processing chip through the high-speed data transmission channel.

13. The method according to claim 12, wherein the high-speed data interface is one of a USB interface, an SDIO interface, and an HSIC interface.

14. The method according to claim 12, further comprising:
establishing a low-speed data transmission channel by connecting a low-speed data interface of the first processing chip with a low-speed data interface of the second processing chip; and
suspending the high-speed data interface and transmitting data through the low-speed data transmission channel, by the first processing chip, upon the condition that no network data is transmitted.

15. The method according to claim 14, wherein the low-speed data interface is one of a UART interface, a 1-wire Bus interface, an I2C interface, and an SPI interface.

16. The method according to claim 12, further comprising:
establishing a status detection channel by connecting a status detection interface of the first processing chip with a status detection interface of the second processing chip; and
transmitting status information through the status detection channel by the first processing chip and the second processing chip.

17. The method according to claim 16, wherein the status detection channel is a bidirectional or unidirectional GPIO interface.

18. The method according to claim 11, wherein a mobile terminal performs wireless communication based on Long Term Evolution (LTE) standard.

19. The method according to claim 11, wherein the first data card is a first subscriber identity module, and the second data card is a second subscriber identity module.

20. The method according to claim 11, further comprising:
transmitting control signal, status information, and data, by an application processing module of the first processing chip and a second protocol stack of the second processing chip.

* * * * *